United States Patent

[11] 3,602,469

| | | |
|---|---|---|
| [72] | Inventor | James C. Hammonds<br>St. Charles, Mo. |
| [21] | Appl. No. | 869,549 |
| [22] | Filed | Oct. 27, 1969 |
| [45] | Patented | Aug. 31, 1971 |
| [73] | Assignee | ACF Industries Incorporated<br>New York, N.Y. |

[54] SELF-ALIGNING, AUTOMATIC-LOCKING TRAILER HITCH HEAD
12 Claims, 10 Drawing Figs.

[52] U.S. Cl. .................................................. 248/119 S,
105/368 S, 287/20.5
[51] Int. Cl. .................................................. B60p 7/00
[50] Field of Search ......................................... 287/20.5;
248/119 S; 105/368 S; 280/435; 85/33; 151/19

[56] References Cited
UNITED STATES PATENTS

| | | | |
|---|---|---|---|
| 2,489,864 | 11/1949 | Cravener .................... | 287/20.5 |
| 2,576,579 | 11/1951 | Donovan ..................... | 85/33 |
| 3,081,115 | 3/1963 | Dickey et al. ............... | 248/119 S |
| 3,143,083 | 8/1964 | Gutridge et al. ............. | 248/119 S |
| 3,346,224 | 10/1967 | Rollins ....................... | 248/119 S |

*Primary Examiner*—Marion Parsons, Jr.
*Attorneys*—Samuel J. Snyder and Eugene N. Riddle

ABSTRACT: A trailer hitch head includes a support structure having a centrally located V-shaped well in which a pair of kingpin-engaging jaws are to move downwardly and inwardly to their closed position when a trailer is deposited on the hitch, or lifted by the trailer and then moved upward and away from each other to their open position by shear pads connected between the jaws and the support structure during unloading of the trailer. Spring pressed plungers lock the jaws in their closed position, until manually retracted immediately before unloading the trailer.

PATENTED AUG 31 1971　　3,602,469

INVENTOR.
JAMES C. HAMMONDS
BY Samuel J. Snyder
ATTORNEY

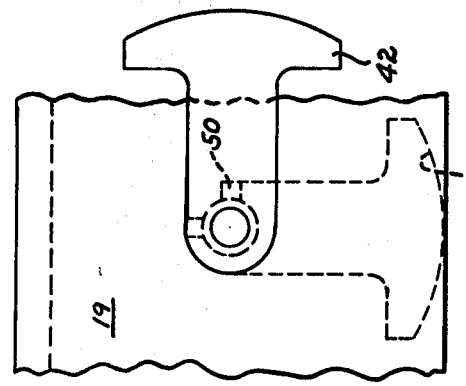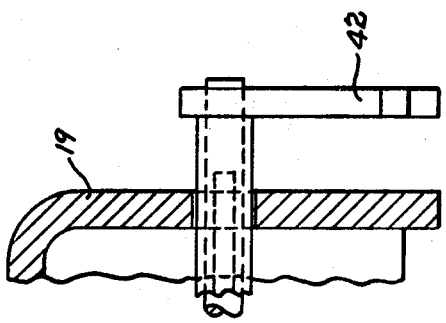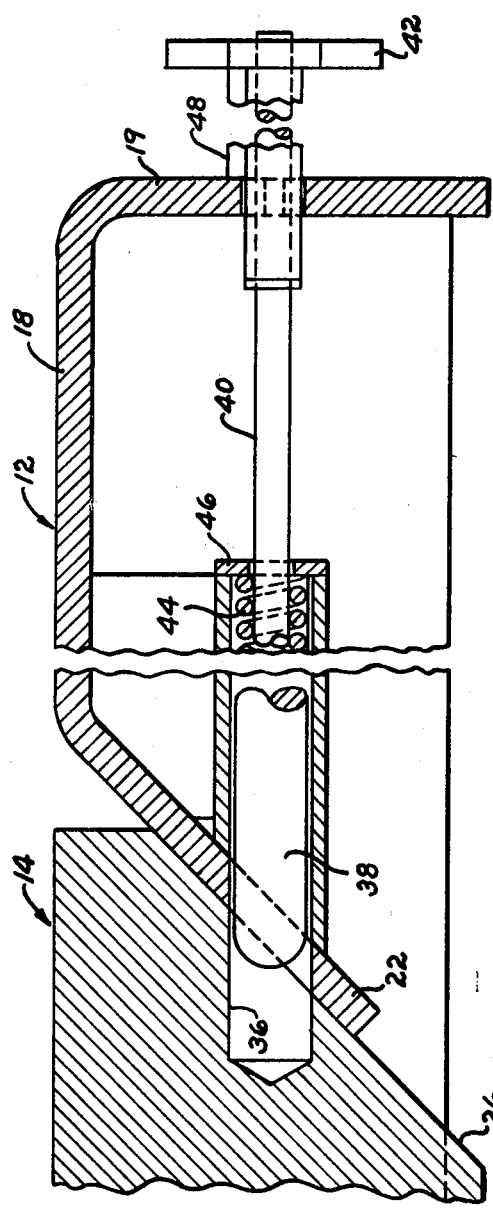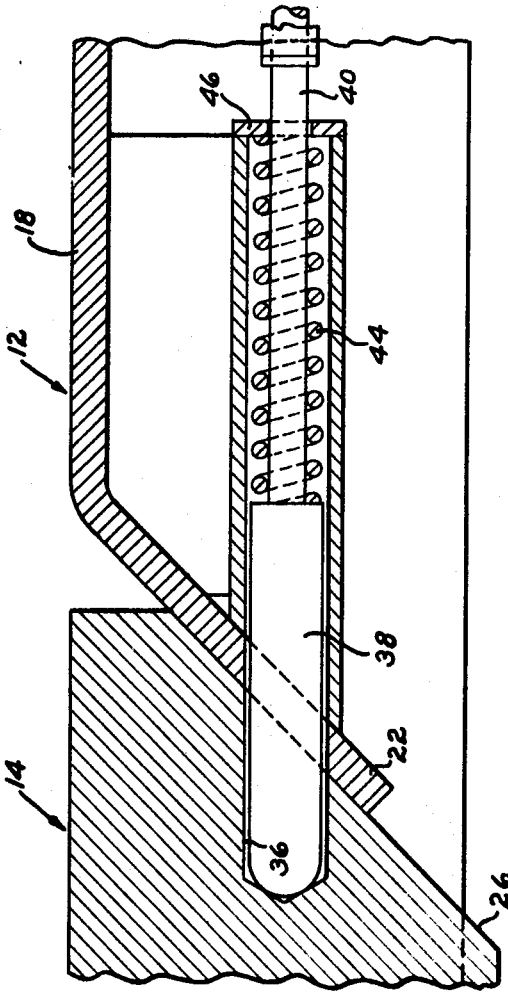

SELF-ALIGNING, AUTOMATIC-LOCKING TRAILER HITCH HEAD

BACKGROUND OF THE INVENTION

Most proposed hitch heads are adapted for tractor loading and unloading of trailers. Some such hitch heads have jaws closed by the tractor and others have manually operated jaws. Hitch heads for use with crane loading and unloading of trailers are also known. There remains, however, a need for a safe hitch head which has few moving parts, is reliable in operation, and preferably self-locking, so that a man does not have to operate the locking mechanism while a possibly unsafe condition exists. The hitch disclosed herein is designed to achieve these objectives in a simple manner.

SUMMARY OF THE INVENTION

The trailer support hitch head of the present invention is intended primarily for loading and unloading trailers by means of a crane. The stand for the hitch head may be of any suitable type, a number of which are now known and in use. The head comprises a large supporting plate structure on which the trailer is adapted to rest. The support structure is provided with a centrally located rectangular well having downwardly converging front and rear sides. Within the well are a pair of telescoping opposed jaws. The jaws have sloping end walls adapted to move on the sloping sides of the well, and are provided with guide pins for confining them to such movement. Shear pads connect the inclined walls of the jaws to the support structure for resiliently holding the jaws in their uppermost position appreciably above the upper face of the support structure. When the trailer is loaded onto the jaws they are pressed downwardly and inwardly toward each other by the weight of the trailer until they seize the slotted kingpin of the trailer. Spring pressed plungers in the support structure are then automatically released and are projected into holes in the inclined walls of the jaws to lock them in their closed position. When the trailer is to be unloaded, the plungers are manually withdrawn and keyed open. The crane then lifts the trailer and the kingpin raises the jaws, causing them to separate until they release the kingpin. The movement of the jaws upward then continues under the action of the shear pads until the jaws reach their uppermost position. The hitch head is ready for reloading after the locking plungers are unkeyed. The hitch head is normally used with a trailer hitch mounted on a railway flat car for the transport of trailers in so-called "piggyback" service.

BRIEF DESCRIPTION OF THE DRAWING

FIG. 5 is a partial sectional view showing one of the locking pins.

FIG. 6 is a partial sectional view showing a locking pin in the unlocked position.

FIG. 7 is an end view of the structure shown in FIG. 6.

DESCRIPTION OF THE PREFERRED EMBODIMENTS

Figure 1:
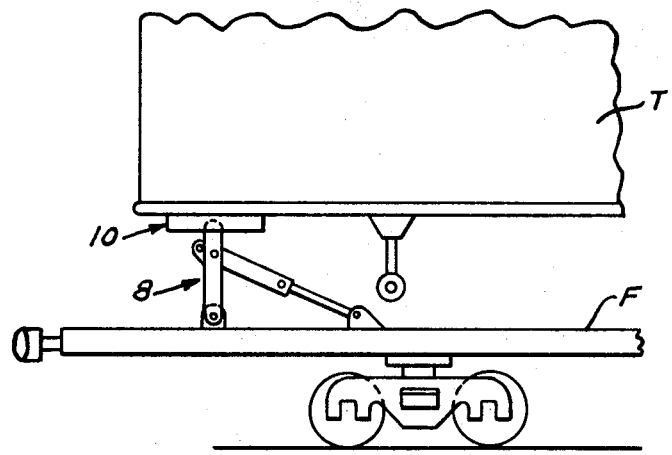
FIG. 1 is a side elevation of a portion of a railway flat car with a hitch having the hitch head comprising the present invention mounted thereon.
Figure 4:
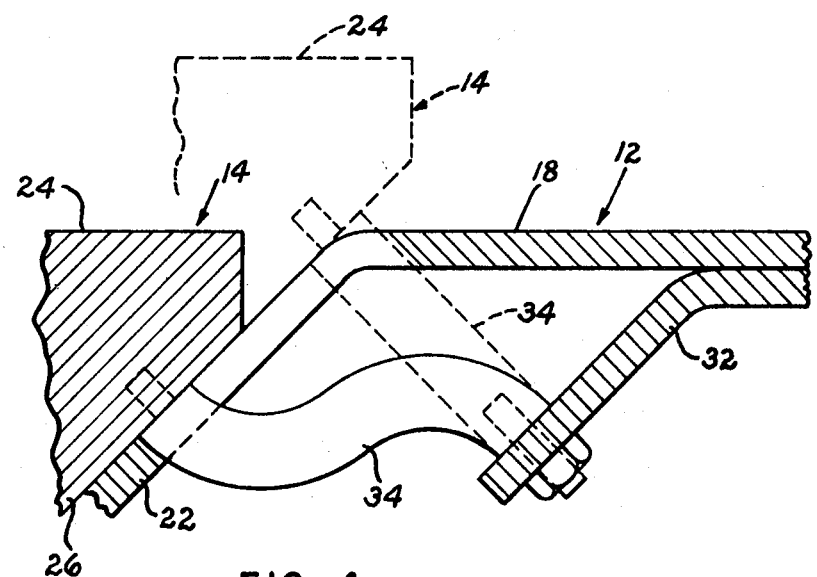
FIG. 4 is a partial sectional view showing one of the shear pads.
Figure 2:
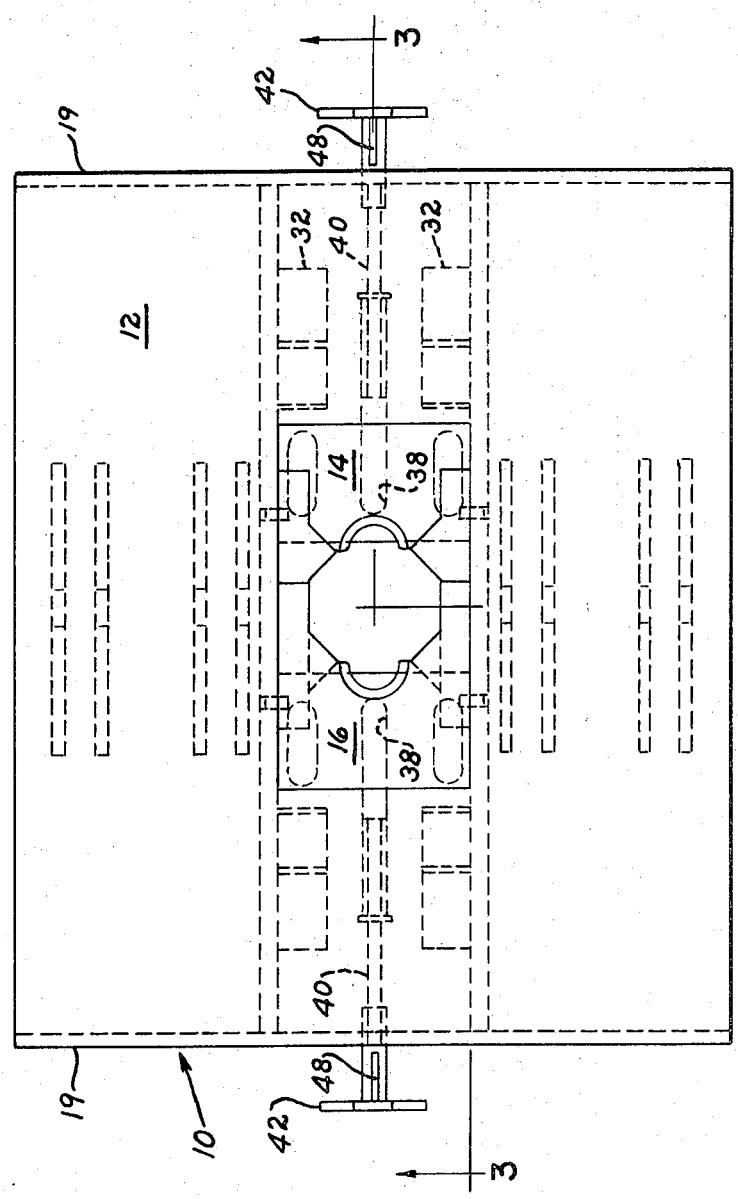
FIG. 2 is a plan view of the hitch head.

Referring to the drawings, a railway flat car F supports a trailer T thereon. A kingpin K on the underside of trailer T is secured by a hitch generally indicated 8. Hitch 8 has a hitch head 10 which includes a supporting plate 12 and a pair of interleaved jaws 14 and 16 for engaging the kingpin K of trailer T as shown in FIG. 3B. Plate 12 has a flat upper surface 18 on which the trailer is adapted to rest and flanges 19 round its periphery. At the center of the plate there is a well or opening 20 defined, in part, by sloping front and rear walls 21 and 22 on which jaws 14 and 16 are adapted to ride. The jaws have a flat upper face 24 and inclined walls 26, 27 which rest on the sloping walls 21 and 22. The movement of the jaws along sloping walls 21, 22 is determined by guide pins 28 extending into slots 30 on both sides of each jaw. Brackets 32 are welded to the underside of plate 12 for supporting rubber shear mounts 34, which are fixed to the jaws. Shear mounts 34 may be rectangular in cross section and are fixed to the jaws so that they normally tend to hold them in their uppermost position.

Sloping walls 26, 27 have holes 36 into which a locking pin 38 is adapted to be inserted. Pin 38 is integral with rod or shaft 40 extending outward beyond the flange 19 and provided with a handle 42. A spring 44 is placed between pin 38 and a stop 46 for normally urging pin 38 inward to the position shown in FIG. 5. Pin 38 can be withdrawn to the position shown in FIG. 6 by means of handle 42. Handle 42 is then turned to the horizontal position, shown in full lines in FIG. 7, securing pin 38 in its unlocked position by means of key 48, which is then turned out the keyway 50 so that it abuts the flange 19, as shown in FIG. 6. As jaws 14, 16 move to their upper position during unloading, pin 38 moves outwardly relieving the pressure of spring 44 from key 48, whereupon handle 42 rotates downward to reset the locking means ready for reloading.

Figure 3A:
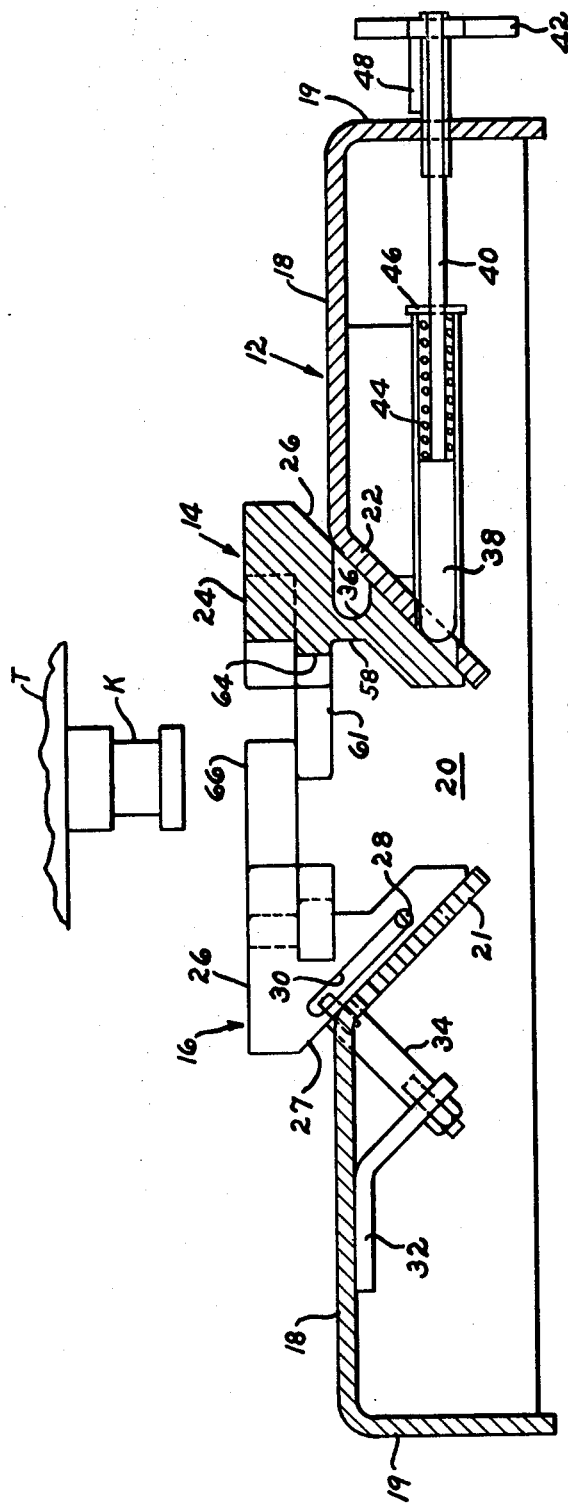
FIG. 3 is a section taken along line 3—3 of FIG. 2 showing the jaws in their open position.
FIG. 3B is a section taken along line 3—3 of FIG. 2 showing the jaws in their closed position.
Figure 3B:
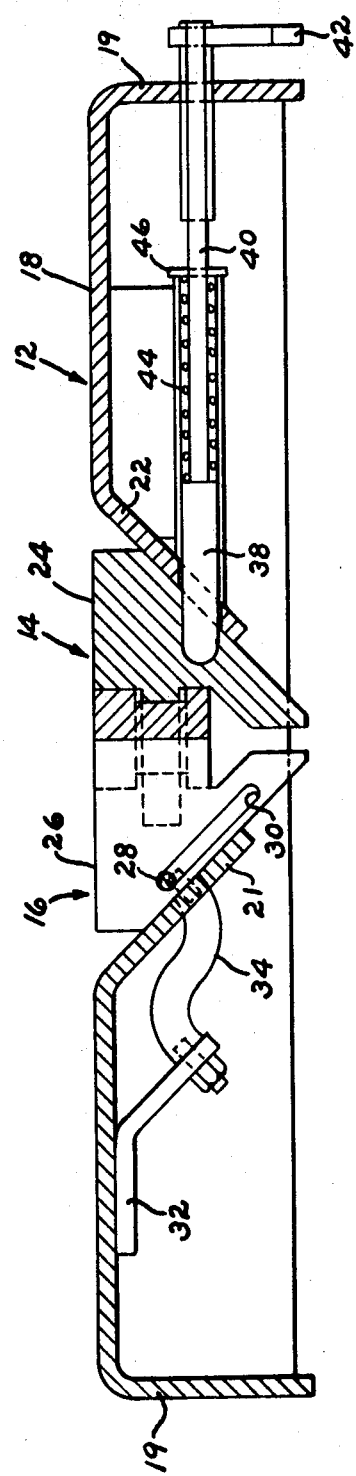
Figure 8:
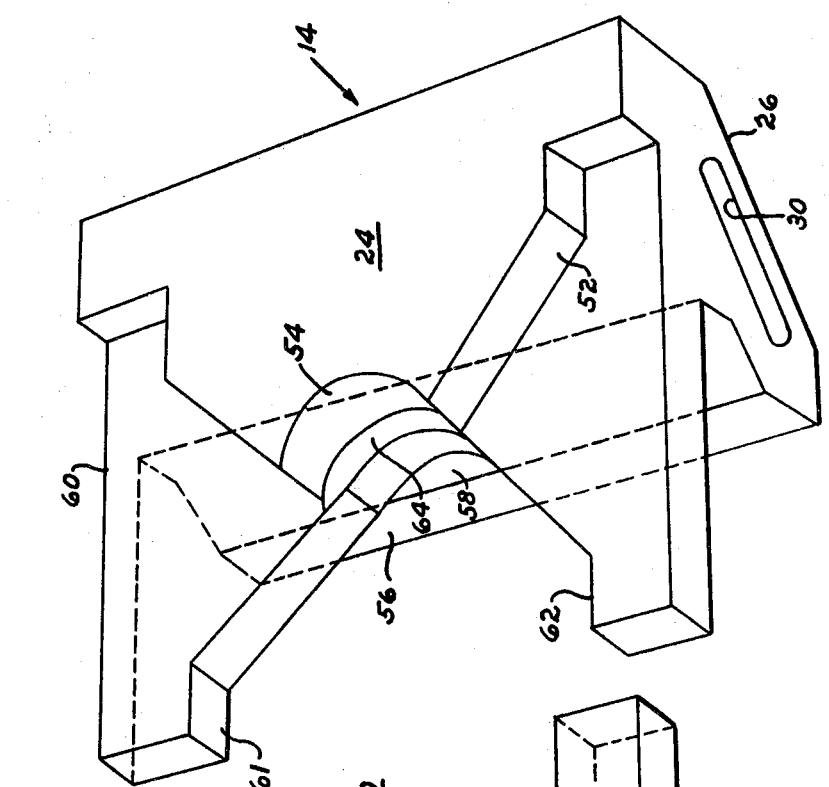
FIGS. 8 and 9 are perspective views of the two jaws.
Figure 9:
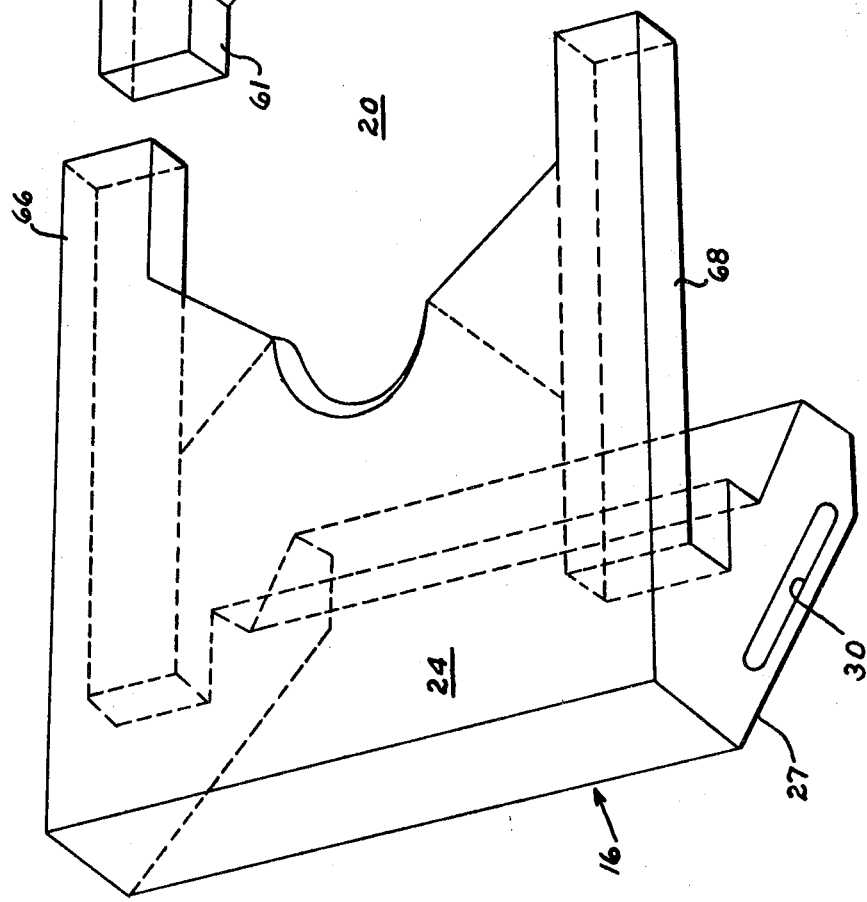

It can be seen from FIGS. 3A and 3B that jaws 14 and 16 are interleaved. The male jaw 14 includes an upper portion 52 having an arcuate cutout 54 adapted to receive the upper portion of the trailer kingpin K. This jaw also has a lower portion 56 having an arcuate cutout 58 adapted to receive the lowermost portion of the kingpin. The intermediate portion 60 of jaw 14 has a pair of projections 61, 62 and a constricted arcuate portion 64 adapted to project into the annular slot of the conventional kingpin for a purpose which will be described below. Jaw 16 is similar to jaw 14 except that it includes projections 66 and 68 adapted to slide over portion 60 of jaw 14. It is evident then that if the jaws move downwardly they will telescope until the large diamond-shaped opening 20 is closed down leaving only openings 54, 58 64 for closely engaging the kingpin.

The hitch head 10 may be supported by any suitable stanchion which generally can be raised and lowered from a collapsed position adjacent the deck of a railway car to an upright position. If a trailer is lowered onto the upright hitch, by a crane or otherwise, the trailer will move jaws 14, 16 downwardly and inwardly. This movement of the jaws will be resisted and cushioned by shear mounts 34. The jaws will be depressed by the weight of the trailer until their upper surfaces 24 are flush with upper face 18 of support plate 12. Handle 42 will have been reset automatically as described above, so that key 48 is aligned with keyway 50. When jaws 14 and 16 have been fully depressed by the trailer thereon, locking pins 38 will be moved by springs 44 into holes 36 in the jaws, thereby automatically locking them in their closed position. The trailer kingpin in opening 20 between the jaws is guided into the aperture defined by surfaces 54, 58, 64 as opening 20 contracts during the closing of the jaws. Thus, the alignment of the kingpin and the front end of the trailer relative to the hitch is effected automatically.

Unloading of a trailer is also very simple. Handles 42 are pulled out and turned to their horizontal positions to hold locking pins 38 in the unlocked position. The trailer is then lifted by the crane causing the kingpin to lift jaws 14, 16, since portions 64 of the jaws extend into the annular slot of the kingpin. The jaws are lifted by the kingpin until they separate enough to release the kingpin and the removal of the trailer can then proceed without interruption, while the jaws continue moving to their uppermost position by virtue of the force applied to them by shear mounts 34. As jaws 14, 16 move upward, locking pins 38 move outward, relieving the pressure of spring 44 from key 48 and allowing counterbalanced handle 42 to rotate downward to reset the locking devices 38–48 for reloading.

What is claimed is:

1. A self-aligning and locking trailer hitch head comprising a support structure having an upper face; a pair of complementary jaws having inclined ends resting on similarly inclined plane surfaces of said support structure, said inclined ends and inclined surfaces sloping toward each other downwardly; guide means for constraining said jaws to move on said inclined surfaces, said jaws having substantially semicircular kingpin receiving openings; spring means connected to said jaws for holding them in an elevated spread-apart position on said support above the upper face thereof, said jaws being movable along said inclined surfaces downwardly and toward each other by the weight of a trailer deposited on said jaws until the jaws enclose the trailer kingpin; locking means automatically enabled by the depression of said jaws to lock said jaws in their closed position, said locking means including means for opening the same.

2. A hitch head according to claim 1, wherein said jaws have overlapping portions adapted to telescope during closure of the jaws.

3. A hitch head according to claim 1, wherein said jaws have opposed horizontal overlapping portions defining V-shaped openings flaring outwardly from the kingpin-receiving openings, whereby the kingpin of a trailer in the V-shaped openings is guided to the kingpin-receiving openings during closure of the jaws.

4. A hitch head according to claim 1, wherein the spring means includes shear pads connection the jaws to the support structure.

5. A hitch head according to claim 4, wherein a shear pad connects the support structure to the inclined end of each jaw so as to urge the jaws upwardly and outwardly from each other.

6. A hitch head according to claim 1, wherein said locking means is reset from a nonlockable to a lockable position in response to the upward movement of the jaws.

7. A trailer hitch head for a railway car comprising a support structure having an upper face; a pair of front and rear kingpin-engaging jaws having upper horizontal surfaces; inclined linear guide means for mounting said jaws on said support structure for guiding said jaws in straight line translatory movement downwardly and longitudinally toward each other to a closed position or upwardly and outwardly from each other; spring means mounted on said support structure for holding said jaws above the upper surface of the support structure, said jaws having opposed complementary kingpin-receiving openings; means for locking said jaws to the support structure when said jaws are in the closed position, whereby depositing a trailer on said hitch head causes the jaws to move downwardly and close about the trailer kingpin and lifting the trailer causes the jaws to rise and open after they are unlocked.

8. A trailer hitch head according to claim 7, wherein said support structure has a well in which said jaws are mounted, said well having downwardly converging front and rear walls on which said front and rear jaws slide.

9. A trailer hitch head according to claim 8, wherein said locking means locks each of said jaws automatically when they reach their closed position, and means for opening said locking means manually.

10. A trailer hitch head according to claim 8, wherein said jaws have constricted portions in said kingpin-receiving openings adapted to engage the constricted portion of a kingpin, whereby raising a trailer from said hitch head lifts and opens said jaws.

11. A trailer hitch head according to claim 10, wherein said jaws include overlapping outwardly flared projections providing a large opening which contracts to said complementary kingpin-receiving openings as said jaws move from their upper position to their lowermost position.

12. A trailer hitch head according to claim 8, wherein said means for locking said jaws are actuated to their locking position in response to downward movement of the jaws and said jaws are reset for subsequent locking in response to upward movement of said jaws.